US012147232B2

(12) United States Patent
Haas-Fickinger et al.

(10) Patent No.: US 12,147,232 B2
(45) Date of Patent: Nov. 19, 2024

(54) METHOD, SYSTEM AND COMPUTER PROGRAM PRODUCT FOR THE AUTOMATED LOCATING OF A VEHICLE

(71) Applicant: Dr. Ing. h.c. F. Porsche Aktiengesellschaft, Stuttgart (DE)

(72) Inventors: Fabian Haas-Fickinger, Stuttgart (DE); Simon Tobias Isele, Stuttgart (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 299 days.

(21) Appl. No.: 17/871,010

(22) Filed: Jul. 22, 2022

(65) Prior Publication Data

US 2023/0024799 A1    Jan. 26, 2023

(30) Foreign Application Priority Data

Jul. 23, 2021   (DE) .................... 10 2021 119 124.6

(51) Int. Cl.
  *G01S 13/86*    (2006.01)
  *G01S 13/89*    (2006.01)
  *G05D 1/00*     (2006.01)
  *G06V 20/56*    (2022.01)
(52) U.S. Cl.
  CPC ............ *G05D 1/021* (2013.01); *G01S 13/867* (2013.01); *G01S 13/89* (2013.01); *G06V 20/56* (2022.01)

(58) Field of Classification Search
  CPC ....... G05D 1/021; G01S 13/867; G01S 13/89; G01S 7/417; G01S 15/86; G01S 17/86; G06V 20/56; G01C 21/3848; G01C 21/3602
  See application file for complete search history.

(56) References Cited

U.S. PATENT DOCUMENTS

| | | | |
|---|---|---|---|
| 11,125,567 B2 | 9/2021 | Kim et al. | |
| 2018/0154901 A1 | 6/2018 | Hasberg et al. | |
| 2019/0171224 A1* | 6/2019 | Meysel | ................... G01S 7/415 |

* cited by examiner

*Primary Examiner* — Yuen Wong
(74) *Attorney, Agent, or Firm* — Gerald E. Hespos; Michael J Porco

(57) ABSTRACT

A method for determining a geographical location of a vehicle (10) includes using a camera/sensor device (20) of the vehicle for recording (S10) first image and sensor data (30) from surroundings of the vehicle (10) while the vehicle (10) is traveling a route. The first image and sensor data (30) are assigned geographical coordinates and are sent to a data evaluation unit (50) for creating a digital map. The method continues by using a second camera and sensor device (20) for recording (S40) second image and sensor data (30) from surroundings while the vehicle (10) is traveling the same route and sending (S50) the recorded second image and sensor data (30) to the data evaluation unit (50). The data evaluation unit (50) compares (S60) the recorded second image and sensor data (30) with the digital map of the surroundings (70) and determines (S70) a position of the vehicle (10).

15 Claims, 2 Drawing Sheets

METHOD, SYSTEM AND COMPUTER PROGRAM PRODUCT FOR THE AUTOMATED LOCATING OF A VEHICLE

CROSS REFERENCE TO RELATED APPLICATION

This application claims priority on German Patent Application No 10 2021 119 124.6 filed Jul. 23, 2021, the entire disclosure of which is incorporated herein by reference.

BACKGROUND

Field of the Invention

The invention relates to a method, a system and a computer program product for the automated locating of a vehicle.

Description of Related Art

The trend toward driver assistance systems (DAS) and highly automated driving functions (HAD) in motor vehicles, aircraft and watercraft, requires extensive safeguarding strategies because the responsibility of vehicle control no longer lies entirely with the driver. Rather, active functions are assumed by computer units in the vehicle. It is therefore necessary to ensure that autonomously moving objects have a very low error rate in terms of driving behavior. These functions also require accurate and up-to-date locating of the vehicle at all times.

Map material in processed and abstracted form is available for location functions of an individual vehicle. It is known to use a camera to capture the surroundings of a vehicle, to compare the data with an existing map and to locate the vehicle by detecting prominent topographical objects in the surroundings of the vehicle.

Such locating can become difficult, however, if the prominent objects are no longer present in the surroundings or the objects are not visible in a camera shot due to the weather conditions. Moreover, maps used from third-party providers are not always up to date, either because new map material is not available or because an update entails costs. Alternatively, data formats used for the map may not meet requirements needed for a higher resolution. In addition, GPS position information may be erroneous, and so automated driving assistance functions cannot rely solely on this locating method.

U.S. Pat. No. 10,816,654 B1 describes a system for locating a ground-based vehicle or a moving object within surroundings. The system captures radar map data from a radar system and compares the radar map data with reference map data. The position of the vehicle or of the moving object then is ascertained by comparing the radar map data against the reference map data.

US 2018/0154901 A1 describes a system for locating a vehicle, having a first sensor unit for determining a relative movement of the vehicle in relation to the vehicle surroundings and a second sensor unit for capturing radar data of the vehicle surroundings.

US 2019 0171224 A1 describes a method for a vehicle to locate itself in its environment. In this case, the surroundings are captured by an environment sensor system while the vehicle is in motion and are compared with a previously created map to ascertain the position of the vehicle on the map.

U.S. Pat. No. 11,125,567 B2 describes a method tat uses radar data received from a radar of the vehicle. A local map is created on the basis of the radar data and that map is compared with a retrieved map to determine a vehicle position.

An object of the invention is to provide a method, a system and a computer program product for automatically locating a vehicle along a route with a high level of safety and reliability.

SUMMARY OF THE INVENTION

A first aspect of the invention relates to a method for automated locating of a vehicle at a geographical location. The method comprises using a camera and sensor device of the vehicle for recording first image and sensor data from the surroundings of the vehicle while the vehicle is traveling along a route. The image and sensor data each are assigned geographical coordinates. The method proceeds by sending the recorded first image and sensor data to a data evaluation unit and creating a digital map of the surroundings by means of the data evaluation unit. The method continues by recording second image and sensor data from the surroundings by means of the camera and sensor device of the vehicle while the vehicle is traveling along the same route and then sending the recorded second image and sensor data to the data evaluation unit. The method continues by using the data evaluation unit for comparing the recorded second image and sensor data with the digital map of the surroundings and then determining a position of the vehicle based on the comparison.

In one aspect of the method, the second image and sensor data is recorded by a second vehicle having a second camera and sensor device.

The method further may comprise using the second image and sensor data for updating the digital map of the surroundings.

The camera and sensor device may comprise a radar system. The camera and sensor device also may comprise a LiDAR (light detection and ranging) system and/or an ultrasonic system and/or at least one RGB camera in the visible wavelength range and/or at least one UV camera in the ultraviolet wavelength range and/or at least one IR camera in the infrared wavelength range.

In a further embodiment, the digital map of the surroundings may be a three-dimensional 3D map and may be based on a radar cartography.

The digital map of the surroundings also may be a semantic graph containing nodes and graph edges, with the graph edges forming connections between the nodes. Partial maps of the surroundings may be created for semantic classes that can be linked with one another.

The data evaluation unit of some embodiments uses artificial intelligence algorithms for handling and evaluating the image and sensor data and for creating the digital map of the surroundings. In particular, the artificial intelligence algorithms may comprise neural networks, such as convolutional neural networks.

In a further embodiment, the maps of the surroundings of vehicles of a vehicle fleet are compared with one another and combined by using a server and/or a cloud computing infrastructure 90.

Another aspect of the invention relates to a system for the automated locating of a vehicle at a geographical location. The system comprises a camera and sensor device arranged on the vehicle and a data evaluation unit. The system is designed to carry out the method described herein.

The camera and sensor device may comprise a radar system and/or a LiDAR (light detection and ranging) system and/or an ultrasonic system and/or at least one RGB camera in the visible wavelength range and/or at least one UV camera in the ultraviolet wavelength range and/or at least one IR camera in the infrared wavelength range.

The digital map of the surroundings may be a three-dimensional 3D map and may be based on a radar cartography.

The digital map of the surroundings also may be a semantic graph containing nodes and graph edges, with the graph edges forming connections between the nodes.

The invention also relates to a computer program product comprising an executable program code that carries out the method described herein.

The invention is explained more thoroughly below on the basis of exemplary embodiments shown in the drawings.

DETAILED DESCRIPTION

Driver assistance systems intervene semiautonomously or autonomously in propulsion, control or signaling devices of a vehicle or use suitable human-machine interfaces to alert the driver just before or during critical situations. The locating of the vehicle in surroundings is significant for proper functioning of a multiplicity of driver assistance systems (DAS) and highly automated driving functions (HAD).

Figure 1:
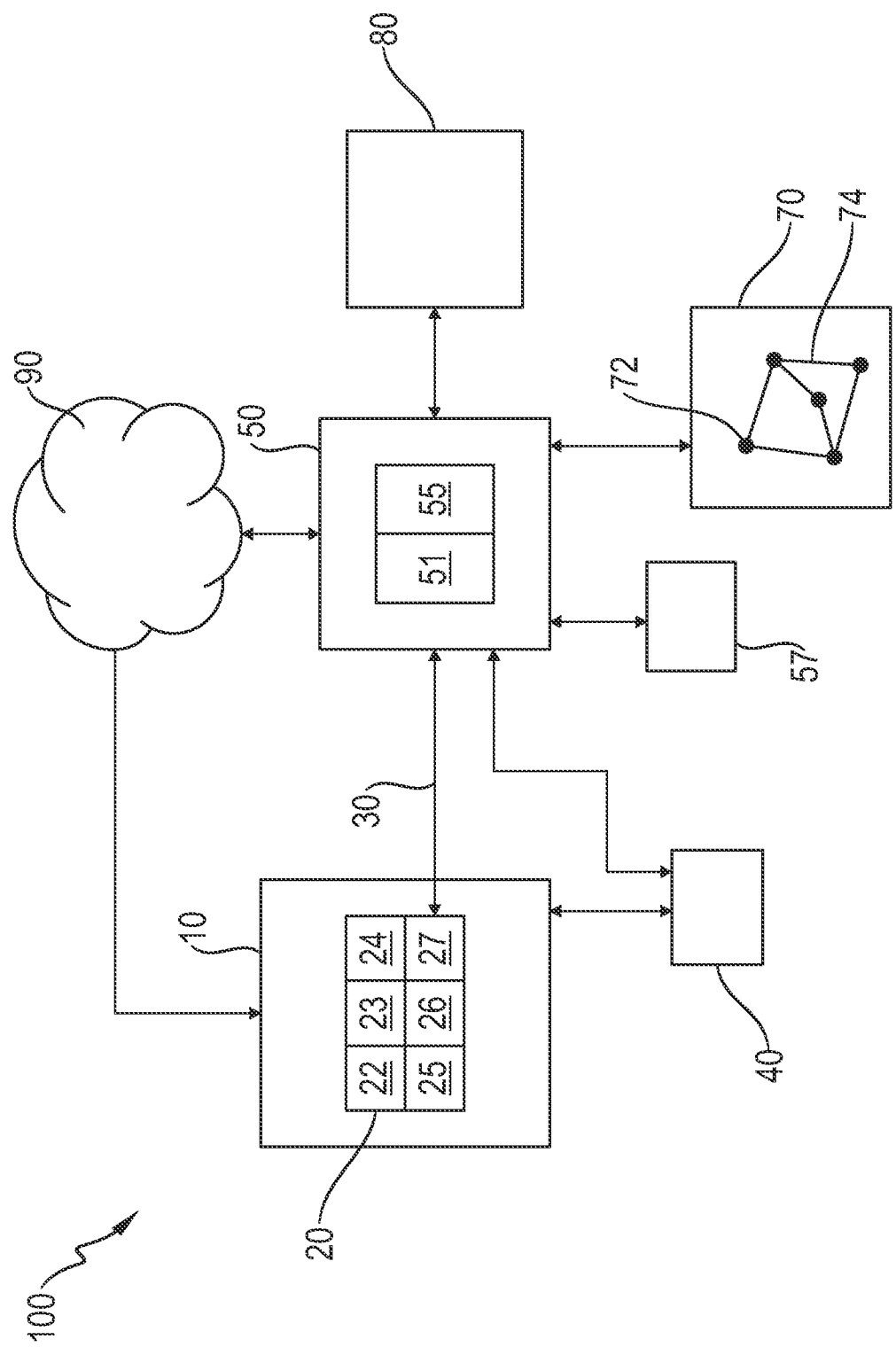
FIG. 1 is a block diagram to explain an exemplary embodiment of a system according to the invention.

FIG. 1 shows a system 100 according an embodiment of the invention for determining the location of a moving vehicle 10 on a route. The moving vehicle 10 may be a motor vehicle, such as a passenger vehicle, a truck, an aircraft or a watercraft. The aircraft may be an unmanned aerial vehicle (drone) and the watercraft may be a ship, boat or ferry. The ascertained position of the vehicle can be used for driver assistance systems (DAS) and highly automated driving functions (HAD).

The vehicle 10 has a camera and sensor device 20 for capturing image and sensor data 30 from surroundings of the vehicle 10. In particular, the camera and sensor device 20 comprises a radar system 22 that can comprise plural radar sensors. In addition, the camera and sensor device 20 can have a LiDAR (light detection and ranging) system 23 and an ultrasonic system 24, for example to measure the distance from a motor vehicle traveling ahead and the velocity of the motor vehicle traveling ahead.

The camera and sensor device 20 can have at least one RGB camera 25 in the visible range having the primary colors blue, green and red. However, there may also be at least one UV camera 26 in the ultraviolet wavelength range and/or at least one IR camera 27 in the infrared wavelength range. The cameras 25, 26, 27 differ in their recording spectrum and can therefore reproduce different light conditions and weather conditions in a recording range. In particular, the cameras 25, 26, 27 may be arranged on the vehicle 10 to afford a 360° panoramic imaging in all spatial directions. Stereoscopic optical camera systems also can be provided. In addition, the camera and sensor device 20 can be equipped with acoustic sensors 28 that use a microphone to capture audible signals. A microphone allows rolling noises from the tires or engine noises to be recorded and may indicate a specific geographical area, for example a specific road surface.

A GPS (Global Positioning System) connection 40 may be provided to ascertain the geographical location with coarse resolution and to assign the recorded image and sensor data 30 to the location.

The recording frequency of the camera and sensor device 20 may be designed for fast velocities of the vehicle 10 and can record image and sensor data 30 at a high data recording frequency. Moreover, the camera and sensor device 20 may automatically start the data recording process when a change that is significant in terms of surface area occurs in the recording range of the camera and sensor device 20, for example when a prominent object such as a building appears in the recording range of the camera and sensor device 30. This allows a selective data capture process, and only relevant image and sensor data 30 are processed by a data processing unit 50. Thus, computing capacities can be used more efficiently.

The camera and sensor device 20 forwards the recorded image and sensor data 30 to the data processing unit 50 for further processing. For example, the image and sensor data 30 recorded by the camera and sensor device 20 may be forwarded to the data processing unit 50 by a wireless mobile radio connection.

The data processing unit 50 preferably has a processor 51 that processes the image and sensor data 30. The processor 51 or a further processor also is designed to control the camera and sensor device 30. The data processing unit 50 and the processor 51 may be integrated in the vehicle 10 and/or in the camera and sensor device 50 or may be in the form of a cloud-based solution with a cloud computing infrastructure 90 that is connected to the vehicle 10 by a mobile radio connection. However, it is also possible for the image and sensor data 30 to be stored in a storage unit 55 and then to be processed by the data processing unit 50.

In the context of the invention, a "processor" can, for example, be a machine or an electronic circuit or a powerful computer. A processor can be a central processing unit (CPU), a microprocessor or a microcontroller, for example an application-specific integrated circuit or a digital signal processor, possibly in combination with a storage unit for storing program commands, etc. A processor also can be a virtualized processor, a virtual machine or a soft CPU and may be a programmable processor that is equipped with configuration steps for carrying out the method according to the invention or is configured with configuration steps so that the programmable processor realizes features according to the method, the component, the modules, or of other aspects and/or partial aspects of the invention. Furthermore, the system may have highly parallel computing units and powerful graphics modules.

In the context of the invention, a "storage unit" or "storage module" and the like can be understood to mean, for example, a volatile memory in the form of a main memory (random access memory, RAM) or a permanent memory such as a hard disk or a data carrier or e.g. an exchangeable storage module. However, the storage module can also be a cloud-based storage solution.

In the context of the invention, a "module" can be understood to mean, for example, a processor and/or a storage unit for storing program commands. By way of example, the module is configured specifically to execute the program commands in such a way that the module executes steps to implement or realize the method of the invention or a step of the method of the invention.

In the context of the invention, recorded image and sensor data 30 are intended to mean both the raw data and already conditioned data from the recording results of the camera and sensor device 20. The data formats of the image and sensor data 30 preferably are in the form of tensors. Other data formats also be used, however.

The camera and sensor device 20 can have mobile radio modules of the 5G standard. 5G is the fifth-generation mobile radio standard and, compared to the 4G mobile radio standard, is distinguished by higher data rates of up to 10 Gbit/sec, the use of higher frequency ranges such as 2100, 2600 or 3600 megahertz, an increased frequency capacity and hence increased data throughput and realtime data transmission, since up to 1 million devices per square kilometer are simultaneously addressable. The latencies are from a few milliseconds to less than 1 ms, which means that realtime transmissions of data and of computation results are possible. The image and sensor data 30 ascertained by the camera and sensor device 20 are sent in real time to a cloud computing infrastructure 90, where the applicable analysis and computation is performed. The analysis and computation results and the position determination are returned to the camera and image device 20 or another control device of the vehicle 10 in real time and therefore can be integrated quickly into action instructions to the driver or into automated driving functions. This speed for the data transmission is required if cloud-based solutions are meant to be used for processing the image and sensor data 30. Cloud-based solutions afford the advantage of high and therefore fast processing powers.

Moreover, the data processing unit 50 can access one or more further databases 57. The database 57 can store for example extraction parameters such as specific objects or road features for analyzing the recorded image and sensor data 30 or further images and/or characteristic quantities. In addition, target quantities and target values that define a safety standard can be stored in the database 57. In addition, there may be provision for a user interface 80 for inputting further data and/or for displaying the map of the surroundings 70 that is created by the data processing unit 50. The user interface 80 may be a screen having a touchscreen and may be the screen of a navigation system of the vehicle 10. However, a mobile terminal, such as a smartphone of the user. may be the output module of the user interface 80 on its own or additionally. It is also conceivable for a computer, for example in a test and development center, as the output module.

The data processing unit 50 or the processor 51 creates a digital map of the surroundings 70 from the captured image and sensor data 30. To this end, the data processing unit 50 or the processor 51 uses artificial intelligence, such as machine learning, algorithms. In particular, there may be provision for artificial neural networks in order to extract relevant image features from the ascertained image and sensor data 30. In particular, the neural network used can be a convolutional neural network.

A neural network has neurons arranged in multiple layers and interconnected in various ways. A neuron is configured to receive information from the outside or from another neuron at its input, to assess the information in a specific manner and to forward the information in changed form at the neuron output to a further neuron, or to output it as a final result. Hidden neurons are arranged between the input neurons and output neurons. Depending on the type of network, there may be multiple layers of hidden neurons to ensure the information is forwarded and processed. Output neurons yield a result and output the result to the outside world. Arranging and linking the neurons gives rise to different types of neural networks, such as feedforward networks, recurrent networks or convolutional neural networks. The networks can be trained by unsupervised or supervised learning.

The convolutional neural network is a special form of an artificial neural network. It has multiple convolutional layers and is very well suited to machine learning and applications using artificial intelligence (AI) in the field of image and voice recognition.

The digital map of the surroundings 70 of the vehicle 10 that is created by the data processing unit 50 is in the form of a three-dimensional 3D map. In particular the radar system 22 allows information to be captured in three-dimensional space and stored in point cloud form as a three-dimensional representation of the surroundings. The advantage of a radar cartography method is the availability of 3D points as low-level signals for characterization of the surroundings.

Moreover, a semantic graph is used for producing and storing the map of the surroundings 70. This involves combining selected image and sensor data 30 and the radar measurement data 32 captured by the radar system 22 at specific nodes 72 of the semantic graph. The connections between these nodes 72 are referred to as graph edges 74 and represent semantic and physical relationships between the individual nodes 72 of the semantic graph. The semantic graph provides the basis for efficiently solving optimization problems by changing the graph edges 74. This allows the map accuracy to be improved by taking into consideration the physical accuracy of the measurement results of the camera and sensor device 20. In particular, the creation of the map of the surroundings 70 can be in the form of an iterative process in which, every time the route is taken, the accuracy and resolution of the map of the surroundings 70 is improved on the basis of newly captured image and sensor data 30. Areas of the route that have changed are updated in the map of the surroundings 70 or additional conditions are formulated for the graph. For example, floor markings in parking garages can be taken as a basis for detecting the outlines of a parking space and plotting them in the map of the surroundings 70. Moreover, a status of the parking space can be noted, such as "vacant" or "occupied", and recorded in the map. Alternatively, it is possible to add to concealed areas in the map of the surroundings 70 that, on a previous trip to the parking garage, had been concealed by parked vehicles.

Producing the map of the surroundings 70 as a semantic graph allows a significant increase in locating accuracy compared to known distance measuring methods, such as lidar or ultrasonic methods. The map of the surroundings 70 stored as a 3D point cloud to ensure efficient use of storage space.

Additionally, the 3D points of the digital map of the surroundings 70 can be provided with additional attributes and properties, such as a specific semantic class relating to specific objects in the surroundings. In addition to a 3D representation of the surroundings on the map of the surroundings 70, each point of the 3D point cloud is provided with an annotation based on semantic information. This can be a type of vehicle, a specific building, a type of vegetation, a road crossing, a set of traffic lights, etc. The additional semantic information in the map of the surroundings 70 can be used to reliably and accurately identify areas in the surroundings that change relatively quickly over time, such as a type of vegetation on the basis of the season. The map of the surroundings 70 can be adapted and updated on the basis of these identified changes.

Semantic information from the map of the surroundings 70 can be used to generate partial maps of the surroundings 72 that contain only semantic information in at least one specific semantic class. A semantic class can be, for example, buildings, factory installations, bridges, sections of freeway, etc. The partial maps of the surroundings 72, which each specifically comprise one or more semantic classes, can be combined. In particular, the semantic classes can be categorized with regard to the probability of their changing over time, for example buildings that are stable over a relatively long period as opposed to vegetation that changes with the season.

For improved capture of semantic classes, the semantic graph can comprise multiple levels. In particular, there is provision for a first level, referred to as "single edge", a second level, referred to as "skip edge", and a third level referred to as "loop closure". The levels can differ from one another by virtue of different weightings for the different semantic classes or the use of different algorithms.

The data processing unit 40 may access image and sensor data 30 recorded by other vehicles 10 of a vehicle fleet and may use all of the data to create the map of the surroundings 70. Thus, the vehicles 30 of a vehicle fleet are equipped with compatible image and sensor devices 30 that exchange among one another and compare with one another to combine and link the graph-based maps of the surroundings 70 that are created individually by each vehicle 10. Thus, when a route is taken repeatedly by multiple vehicles 10, a collective map of the surroundings 70 is generated and has improved resolution and accuracy. Since the map of the surroundings 70 is formulated as a graph, it is possible to link individual map parts and specific map points with one another by appropriate constraints. Partial maps of the map of the surroundings 70 can be optimized and processed in the data processing unit 40 in the vehicle 10 or outside the vehicle 10, for example in a backend server or a cloud computing infrastructure 90. All vehicles 10 of the vehicle fleet are then connected to one another via the backend server or the cloud computing infrastructure 90.

An illustrative application of the present invention is trained parking at locations at which GPS functionalities are not available, such as for example in specific parking garages. According to the invention, the driver of the vehicle 10 covers a specific route as a training journey. The data processing unit 50 creates a map of the surroundings 70 relating to this training journey. The map stores the trajectory covered. When the route is taken again, the 3D points stored on this map of the surroundings 70 can be used to locate the position of the vehicle 10 on the map by means of the image and sensor data 30 currently ascertained by the camera and sensor device 20.

Figure 2:
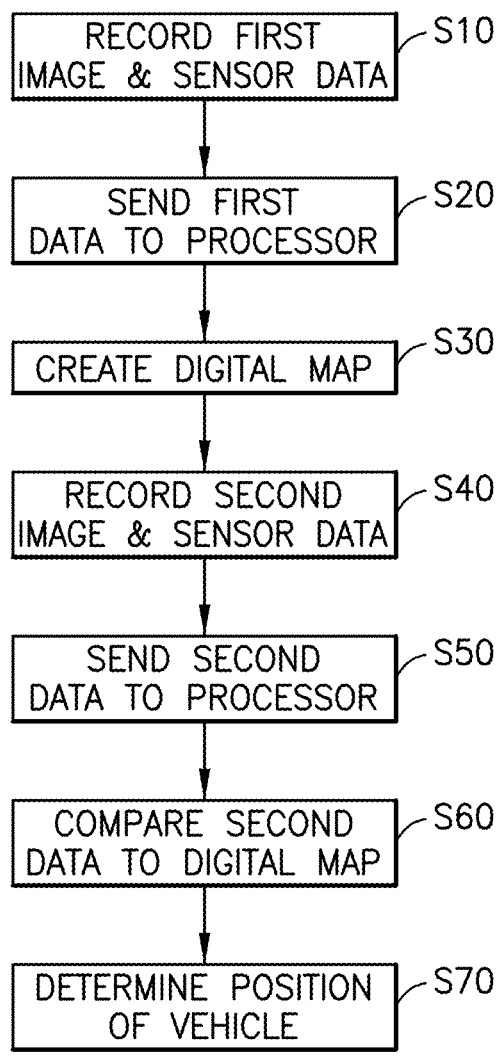
FIG. 2 is a flowchart to explain the method steps of the invention.

FIG. 2 shows the method steps of the method according to the invention.

In step S10, first image and sensor data 30 from surroundings of a vehicle 10 are recorded by a camera and sensor device 20 of the vehicle while the vehicle 10 is traveling along a route. The image and sensor data 30 are assigned geographical coordinates.

In step S20, the recorded first image and sensor data 30 are sent to a data evaluation unit 50.

In step S30, the data evaluation unit 50 creates a digital map of the surroundings 70.

In step S40, second image and sensor data 30 from the surroundings of the vehicle 10 are recorded by the camera and sensor device 20 while the vehicle 10 is traveling along the same route.

In step S50, the recorded second image and sensor data 30 are sent to the data evaluation unit 50.

In step S60, the data evaluation unit 50 compares the recorded second image and sensor data 30 with the digital map of the surroundings 70.

In step S70, a position of the vehicle 10 is determined.

Figure 3:
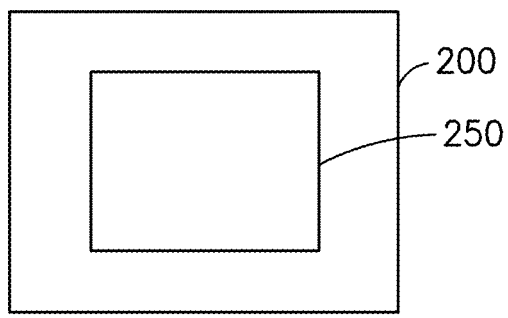
FIG. 3 schematically shows a computer program product according to an embodiment of the invention.

FIG. 3 schematically shows a computer program product 200 comprising an executable program code 250 that is configured to carry out the method according to the first aspect of the present invention.

The method according to the invention can be used to better locate the position of a vehicle. This is crucial in particular for automatic driving functions that are based on knowledge of the exact geographical position of the vehicle.

REFERENCE SIGNS

10 vehicle
20 camera and sensor device
22 radar system
23 LiDAR system
24 ultrasonic system
25 RGB camera
26 UV camera
27 IR camera
30 image and sensor data
40 GPS connection
50 data evaluation unit
51 processor
55 storage unit
57 database
70 map of the surroundings
90 cloud computing infrastructure
100 system
200 computer program product
250 program code

What is claimed is:

1. A method for automated locating of a vehicle at a geographical location, comprising:
   recording, by a camera and sensor device of the vehicle, first image and sensor data from surroundings of the vehicle while the vehicle is traveling along a route, and assigning each of the first image and sensor data geographical coordinates;
   sending the recorded first image and sensor data to a processor;
   creating, by the processor, a digital map of the surroundings;
   recording second image and sensor data from the surroundings of the vehicle while the vehicle is traveling along the route;
   sending the recorded second image and sensor data to the processor;
   comparing, by the processor, the recorded second image and sensor data with the digital map of the surroundings;
   determining a position of the vehicle;
   enabling automatic driving functions of the vehicle based on the determined position of the vehicle.

2. The method of claim 1, wherein the second image and sensor data are recorded by a second vehicle having a second camera and sensor device.

3. The method of claim 1, further comprising updating the digital map of the surroundings by using the second image and sensor data.

4. The method of claim 1, wherein the camera and sensor device comprises a radar system.

5. The method of claim 4, wherein the camera and sensor device comprises at least one of a LIDAR (light detection and ranging) system, an ultrasonic system, at least one RGB camera in an visible wavelength range, at least one UV camera in an ultraviolet wavelength range and at least one IR camera in an infrared wavelength range.

6. The method of claim 1, wherein the digital map of the surroundings is a three-dimensional map and is based on a radar cartography.

7. The method of claim 1, wherein the digital map of the surroundings is a semantic graph containing nodes and graph edges, the graph edges forming connections between the nodes.

8. The method of claim 7, further comprising creating partial maps of the surroundings for semantic classes that are capable of linking with one another.

9. The method of claim 1, further comprising for handling and evaluating the first image and sensor data and for creating the digital map of the surroundings by using artificial intelligence algorithms in the processor.

10. The method of claim 9, wherein the artificial intelligence algorithms comprise neural networks.

11. The method of claim 1, further comprising using a server and/or a cloud computing infrastructure for comparing and combining digital maps of the surroundings of vehicles of a vehicle fleet.

12. A system for automated locating of a vehicle at a geographical location, comprising:
   a camera and sensor device arranged on the vehicle; and
   processor, the processor being designed to carry out the method of claim 1.

13. The system of claim 12, wherein the camera and sensor device comprise at least one of a radar system, a LIDAR (light detection and ranging) system, an ultrasonic system, at least one RGB camera in an visible wavelength range, at least one UV camera in an ultraviolet wavelength range and at least one IR camera in an infrared range.

14. The system of claim 12, wherein the digital map of the surroundings is in a form of a three-dimensional 3D map and is based on a radar cartography, and wherein the digital map of the surroundings is in a form of a semantic graph containing nodes and graph edges, the graph edges forming connections between the nodes.

15. The system of claim 12, wherein the digital map of the surroundings is in a form of a semantic graph containing nodes and graph edges, the graph edges forming connections between the nodes.

* * * * *